US011130893B2

(12) United States Patent
Rached

(10) Patent No.: US 11,130,893 B2
(45) Date of Patent: Sep. 28, 2021

(54) HEAT TRANSFER FLUID

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/142,492

(22) Filed: Sep. 26, 2018

(65) Prior Publication Data

US 2019/0203094 A1 Jul. 4, 2019

Related U.S. Application Data

(63) Continuation of application No. 15/396,855, filed on Jan. 3, 2017, now abandoned, which is a continuation of application No. 14/873,855, filed on Oct. 2, 2015, now Pat. No. 9,599,381, which is a continuation of application No. 13/122,606, filed as application No. PCT/FR2009/051814 on Sep. 24, 2009, now abandoned.

(30) Foreign Application Priority Data

Oct. 8, 2008 (FR) ...................................... 08.56817
Oct. 9, 2008 (FR) ...................................... 08.56836

(51) Int. Cl.
| | |
|---|---|
| *C09K 5/04* | (2006.01) |
| *C08J 9/14* | (2006.01) |
| *F25B 45/00* | (2006.01) |
| *C10M 171/00* | (2006.01) |
| *F25B 31/00* | (2006.01) |
| *C10N 20/00* | (2006.01) |
| *C10N 40/30* | (2006.01) |

(52) U.S. Cl.
CPC .............. *C09K 5/045* (2013.01); *C08J 9/146* (2013.01); *C10M 171/008* (2013.01); *F25B 31/002* (2013.01); *F25B 45/00* (2013.01); *C09K 2205/122* (2013.01); *C09K 2205/126* (2013.01); *C09K 2205/22* (2013.01); *C09K 2205/40* (2013.01); *C09K 2205/43* (2013.01); *C10M 2203/003* (2013.01); *C10M 2203/065* (2013.01); *C10M 2209/043* (2013.01); *C10M 2209/1033* (2013.01); *C10N 2020/101* (2020.05); *C10N 2040/30* (2013.01)

(58) Field of Classification Search
CPC .............. C09K 5/045; C09K 2205/126; C09K 2205/22; C09K 2205/40
See application file for complete search history.

(56) References Cited

U.S. PATENT DOCUMENTS

| | | |
|---|---|---|
| 6,176,102 B1 | 1/2001 | Novak et al. |
| 6,503,417 B1 | 1/2003 | Bivens |
| 8,070,977 B2 | 12/2011 | Rached |
| 8,075,798 B2 | 12/2011 | Rached |
| 8,246,850 B2 | 8/2012 | Rached |
| 8,252,198 B2 | 8/2012 | Rached |
| 8,557,135 B2 | 10/2013 | Rached |
| 8,808,569 B2 | 8/2014 | Rached |
| 8,858,824 B2 | 10/2014 | Boussand |
| 8,858,825 B2 | 10/2014 | Guerin et al. |
| 8,992,793 B2 | 3/2015 | Sato |
| 9,011,711 B2 | 4/2015 | Rached |
| 9,028,706 B2 | 5/2015 | Rached et al. |
| 9,039,922 B2 | 5/2015 | Rached |
| 9,046,348 B2 | 6/2015 | Abbas |
| 9,057,010 B2 | 6/2015 | Rached |
| 9,127,191 B2 | 9/2015 | Rached |
| 9,133,379 B2 | 9/2015 | Rached |
| 9,175,203 B2 | 11/2015 | Rached |
| 9,267,064 B2 | 2/2016 | Rached |
| 9,315,708 B2 | 4/2016 | Guerin et al. |
| 9,359,540 B2 | 6/2016 | Rached |
| 9,399,726 B2 | 7/2016 | Rached |
| 9,505,968 B2 | 11/2016 | Rached |
| 9,512,343 B2 | 12/2016 | Rached et al. |
| 9,599,381 B2 | 3/2017 | Rached |
| 9,650,551 B2 | 5/2017 | Collier et al. |
| 9,650,553 B2 | 5/2017 | Deur-Bert et al. |
| 9,663,697 B2 | 5/2017 | Rached |
| 9,676,984 B2 | 6/2017 | Guerin et al. |
| 9,683,154 B2 | 6/2017 | Rached |
| 9,683,155 B2 | 6/2017 | Deur-Bert et al. |
| 9,683,157 B2 | 6/2017 | Rached |
| 9,845,419 B2 | 12/2017 | Yana Motta et al. |

(Continued)

FOREIGN PATENT DOCUMENTS

| | | |
|---|---|---|
| EP | 2 149 592 A2 | 2/2010 |
| FR | 2 182 956 A3 | 12/1973 |

(Continued)

OTHER PUBLICATIONS

U.S. Appl. No. 16/339,956, Rached—See Information Below.
U.S. Appl. No. 16/339,903, Rached—See Information Below.
International Search Report issued in PCT/FR2009/051814, dated Feb. 1, 2010, EPO, Rijswijk, NL, 4 pages (English/French language versions).
Third Party Observation for Application No. EP20090759757 mailed by EPO Apr. 10, 2014 in corres. European Application.
CAS Reg. No. 754-12-1, Nov. 16, 1984, 1 page.
CAS Reg. No. 75-10-5, Nov. 16, 1984, 1 page.

(Continued)

*Primary Examiner* — John R Hardee
(74) *Attorney, Agent, or Firm* — Buchanan Ingersoll & Rooney P.C.

(57) ABSTRACT

Compositions which are based on tetrafluoropropene and more particularly relates to compositions including 60% to 90% by weight of 2,3,3,3-tetrafluoropropene and 10% to 40% by weight of at least one compound selected from difluoroethane and difluoromethane, which can be used as a heat transfer fluid. The compositions may include 60% to 79% by weight of 2,3,3,3-tetrafluoropropene and 21% to 40% by weight of a compound selected from difluoroethane and difluoromethane.

16 Claims, No Drawings

(56) References Cited

U.S. PATENT DOCUMENTS

| | | |
|---|---|---|
| 9,884,984 B2 | 2/2018 | Rached |
| 9,908,828 B2 | 3/2018 | Rached et al. |
| 9,969,918 B2 | 5/2018 | Deur-Bert et al. |
| 10,023,780 B2 | 7/2018 | Guerin et al. |
| 10,035,938 B2 | 7/2018 | Rached |
| 10,119,055 B2 | 11/2018 | Boussand |
| 10,125,296 B2 | 11/2018 | Rached |
| 10,131,829 B2 | 11/2018 | Deur-Bert et al. |
| 10,208,236 B2 | 2/2019 | Minor et al. |
| 10,252,913 B2 | 4/2019 | Bonnet |
| 10,316,231 B2 | 6/2019 | Rached |
| 10,358,592 B2 | 7/2019 | Rached |
| 10,377,935 B2 | 8/2019 | Guerin et al. |
| 10,399,918 B2 | 9/2019 | Rached |
| 10,450,488 B2 | 10/2019 | Boussand |
| 10,604,690 B2 | 3/2020 | Collier et al. |
| 10,618,861 B2 | 4/2020 | Rached |
| 10,662,357 B2 | 5/2020 | Boussand |
| 10,808,157 B2 | 10/2020 | Rached |
| 10,858,562 B2 | 12/2020 | Rached |
| 10,954,467 B2 | 3/2021 | Rached |
| 11,001,546 B2 | 5/2021 | Deur-Bert et al. |
| 2006/0243944 A1 | 11/2006 | Minor et al. |
| 2007/0007488 A1 | 1/2007 | Singh et al. |
| 2007/0069175 A1 | 3/2007 | Thomas et al. |
| 2008/0184731 A1 | 8/2008 | Sienel et al. |
| 2008/0230738 A1 | 9/2008 | Minor et al. |
| 2008/0314073 A1 | 12/2008 | Minor |
| 2009/0120619 A1 | 5/2009 | Sievert |
| 2009/0253820 A1 | 10/2009 | Bowman et al. |
| 2009/0267019 A1 | 10/2009 | Motta et al. |
| 2009/0314015 A1 | 12/2009 | Minor et al. |
| 2010/0044619 A1 | 2/2010 | Hulse et al. |
| 2010/0122545 A1 | 5/2010 | Minor et al. |
| 2010/0186432 A1 | 7/2010 | Perti et al. |
| 2010/0319377 A1 | 12/2010 | Moriwaki et al. |
| 2010/0326129 A1 | 12/2010 | Moriwaki et al. |
| 2011/0084228 A1 | 4/2011 | Rached |
| 2011/0089366 A1 | 4/2011 | Rached |
| 2011/0095224 A1 | 4/2011 | Rached |
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0068105 A1 | 3/2012 | Rached et al. |
| 2012/0097885 A9 | 4/2012 | Hulse et al. |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2012/0255316 A1 | 10/2012 | Andre et al. |
| 2013/0055733 A1 | 3/2013 | Rached |
| 2013/0055738 A1 | 3/2013 | Rached |
| 2013/0055739 A1 | 3/2013 | Rached |
| 2013/0061613 A1 | 3/2013 | Rached |
| 2013/0092869 A1 | 4/2013 | Boussand |
| 2013/0096218 A1 | 4/2013 | Rached |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0075969 A1 | 3/2014 | Guerin et al. |
| 2014/0166923 A1 | 6/2014 | Motta et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0184051 A1 | 7/2015 | Rached |
| 2015/0184052 A1 | 7/2015 | Rached |
| 2015/0322317 A1 | 11/2015 | Collier et al. |
| 2015/0322321 A1 | 11/2015 | Deur-Bert et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2016/0009555 A1 | 1/2016 | Bonnet et al. |
| 2016/0024363 A1 | 1/2016 | Rached |
| 2016/0025394 A1 | 1/2016 | Rached |
| 2016/0115361 A1 | 4/2016 | Boussand |
| 2016/0122609 A1 | 5/2016 | Rached |
| 2016/0194541 A1 | 7/2016 | Guerin et al. |
| 2016/0244652 A1 | 8/2016 | Rached |
| 2016/0272561 A1 | 9/2016 | Rached et al. |
| 2016/0298014 A1 | 10/2016 | Rached |
| 2016/0355718 A1 | 12/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |
| 2017/0145276 A1 | 5/2017 | Rached |
| 2017/0210960 A1 | 7/2017 | Deur-Bert et al. |
| 2017/0210962 A1 | 7/2017 | Collier et al. |
| 2017/0218241 A1 | 8/2017 | Deur-Bert et al. |
| 2017/0218242 A1 | 8/2017 | Rached |
| 2018/0086173 A1 | 3/2018 | Rached |
| 2018/0134936 A1 | 5/2018 | Rached |
| 2018/0148395 A1 | 5/2018 | Rached et al. |
| 2018/0244970 A1 | 8/2018 | Rached |
| 2018/0282603 A1 | 10/2018 | Guerin |
| 2018/0327645 A1 | 11/2018 | Boussand |
| 2019/0023957 A1 | 1/2019 | Rached |
| 2019/0249057 A1 | 8/2019 | Rached |
| 2019/0284500 A1 | 9/2019 | Rached |
| 2019/0337874 A1 | 11/2019 | Rached et al. |
| 2019/0359870 A1 | 11/2019 | Rached |
| 2019/0367789 A1 | 12/2019 | Rached |
| 2020/0048518 A1 | 2/2020 | Rached |
| 2020/0216734 A1 | 7/2020 | Rached et al. |
| 2020/0263068 A1 | 8/2020 | Hulse et al. |
| 2020/0407613 A1 | 12/2020 | Rached |
| 2021/0017107 A1 | 1/2021 | Deur-Bert et al. |
| 2021/0046802 A1 | 2/2021 | Rached |

FOREIGN PATENT DOCUMENTS

| | | |
|---|---|---|
| FR | 2 256 381 A | 7/1975 |
| JP | H04-110388 | 4/1992 |
| JP | H10-267441 A | 10/1998 |
| JP | 2000-161805 | 6/2000 |
| JP | 2005-202637 A | 7/2005 |
| JP | 2005-214492 A | 8/2005 |
| JP | 2005-214493 A | 8/2005 |
| JP | 2008-134031 A | 6/2008 |
| JP | 2008-531836 A | 8/2008 |
| JP | 2009-532520 A | 9/2009 |
| JP | 2009-257743 A | 11/2009 |
| JP | 2010-002074 A | 1/2010 |
| RU | 2 189 544 C2 | 9/2002 |
| WO | WO 2004/037913 A2 | 5/2004 |
| WO | WO 2004/037913 A3 | 5/2004 |
| WO | WO 2005/105947 A2 | 11/2005 |
| WO | WO 2005/105947 A3 | 11/2005 |
| WO | WO 2006/094303 A2 | 9/2006 |
| WO | WO 2006/094303 A3 | 9/2006 |
| WO | WO 2006/101563 A2 | 9/2006 |
| WO | WO 2006/101563 A3 | 9/2006 |
| WO | WO 2007/126414 A2 | 11/2007 |
| WO | WO 2007/126414 A3 | 11/2007 |
| WO | WO 2008/009922 A2 | 1/2008 |
| WO | WO 2008/027555 A2 | 3/2008 |
| WO | WO 2008/027555 A3 | 3/2008 |
| WO | WO 2008/085314 A2 | 7/2008 |
| WO | WO 2008/140809 A2 | 11/2008 |
| WO | WO 2009/107364 A1 | 9/2009 |
| WO | WO 2009/110228 A1 | 9/2009 |
| WO | WO 2010/000993 A2 | 1/2010 |
| WO | WO 2010/000993 A3 | 1/2010 |
| WO | WO 2010/000994 A2 | 1/2010 |
| WO | WO 2010/000994 A3 | 1/2010 |

(56) References Cited

FOREIGN PATENT DOCUMENTS

| WO | WO 2010/002016 A1 | 1/2010 |
|---|---|---|
| WO | WO 2010/002023 A1 | 1/2010 |
| WO | WO 2010/040928 A1 | 4/2010 |
| WO | WO 2010/059677 A2 | 5/2010 |
| WO | WO 2010/059677 A3 | 5/2010 |
| WO | WO 2010/061084 A1 | 6/2010 |

OTHER PUBLICATIONS

Bigot, G., et al., "Optimized Design of Heat Exchangers for "Reversible" Heat Pump Using R-407C," Paper 463, *Eighth International Refrigeration and Air Conditioning Conference at Purdue University*, West Lafayette, IN, USA, Jul. 25-28, 2000, pp. 38-46, Purdue University, Purdue e-Pubs, http://docs.lib.purdue.edu/iracc/463.

Liu, X., "Efficiency of Non-Azeotropic Refrigerant Cycle," *International Refrigeration and Air Conditioning Conference*, Paper 396, 1998, pp. 108-114, Purdue University, Purdue e-Pubs, http://docs.lib.purdue.edu/iracc/396.

Minor, Barbara Haviland, et al., Certified U.S. Appl. No. 61/116,029, filed Nov. 19, 2008, 60 pages, including cover page (citation O1a).

Minor, Barbara Haviland, et al., Certified U.S. Appl. No. 61/180,201, filed May 21, 2009, 63 pages, including cover page (citation O1b).

Radermacher, R., et al., "Vapor Compression Heat Pumps with Refrigerant Mixtures," 2005, 4 pages, CRC Press, Taylor & Francis Group, Boca Raton, FL.

Excerpt from *Römpp Chemistry Encyclopedia*, Editors: Prof. Dr. Jürgen Falbe, Prof Dr. Manfred Regitz, "binary system", 1996, three pages including p. 432, Georg Thieme Verlag, Stuttgart, DE.

Excerpt from *Heat and Mass Transfer, Second, revised Edition*, Editors: Hans Dieter Baehr, Karl Stephan, 2006, 21 pages, including pp. 40-57, Springer, Berlin-Heidelberg-New York.

Racked, Wissam, U.S. Appl. No. 16/339,956 entitled "Use of Tetrafluoropropene Based Compositions", filed in the U.S. Patent and Trademark Office on Apr. 5, 2019.

Racked, Wissam, U.S. Appl. No. 16/339,903 entitled "Tetrafluoropropene-Based Azeotropic Compositions," filed in the U.S. Patent and Trademark Office on Apr. 5, 2019.

Rached, Wissam, U.S. Appl. No. 16/395,413 entitled "Low-Temperature and Average-Temperature Refrigeration," filed in the U.S. Patent and Trademark Office on Apr. 26, 2019.

Rached, Wissam, U.S. Appl. No. 16/477,263 entitled "Composition Comprising 2,3,3,3-Tetrafluoropropene," filed in the U.S. Patent and Trademark Office on Jul. 11, 2019.

Rached, Wissam, U.S. Appl. No. 16/477,318 entitled "Composition Comprising 2,3,3,3-Tetrafluoropropene," filed in the U.S. Patent and Trademark Office on Jul. 11, 2019.

Rached, Wissam, U.S. Appl. No. 16/514,241 entitled "Stabilization of 1-Chloro-3,3,3-Trifluoropropene," filed in the U.S. Patent and Trademark Office on Jul. 17, 2019.

Notice of Reasons for Refusal (Office Action) issued by the Japanese Patent Office in Japanese Patent Application No. 2018-215896, dated Nov. 15, 2019, and English-language translation (8 pages).

Decision of Refusal dated Sep. 9, 2020 in JP 2018-215896, Japanese Patent Office, Tokyo, JP, Japanese and English-language translation, 6 pages.

Rached, Wissam, U.S. Appl. No. 16/962,143 entitled "Heat Transfer Compositions as Replacement for R-134a," filed in the U.S. Patent and Trademark Office on Jul. 14, 2020.

Rached, Wissam, U.S. Appl. No. 16/965,533 entitled "Method for Cooling and/or Heating a Body or a Fluid in a Motor Vehicle," filed in the U.S. Patent and Trademark Office on Jul. 28, 2020.

Deur-Bert, Dominique, et al., U.S. Appl. No. 16/965,638 entitled "Ternary Azeotropic or Quasi-Azeotropic Composition Comprising HF, 2,3,3,3-Tetrafluoropropene and 1,1,1,2,2-Pentafluoropropane," filed in the U.S. Patent and Trademark Office on Jul. 29, 2020.

Rached, Wissam, et al., U.S. Appl. No. 17/147,202 entitled "Composition Based on 2,3,3,3-Tetrafluoropropene," filed in the U.S. Patent and Trademark Office on Jan. 12, 2021.

Rached, Wissam, U.S. Appl. No. 17/164,888 entitled "Use of Tetrafluoropropene Based Compositions," filed in the U.S. Patent and Trademark Office on Feb. 2, 2021.

U.S. Appl. No. 17/147,202, Wissam Rached and Béatrice Boussand, filed Jan. 12, 2021.

U.S. Appl. No. 17/164,888, Wissam Rached, filed Feb. 2, 2021.

U.S. Appl. No. 16/962,143, Wissam Rached, filed Jul. 14, 2020.

U.S. Appl. No. 16/965,533, Wissam Rached, filed Jul. 28, 2020.

U.S. Appl. No. 16/965,638, Dominique Deur-Bert, Laurent Wendlinger, Béatrice Berger, filed Jul. 29, 2020.

HEAT TRANSFER FLUID

CROSS REFERENCE TO RELATED APPLICATIONS

The present application is a continuation of U.S. application Ser. No. 15/396,855, filed on Jan. 3, 2017, which is a continuation of U.S. application Ser. No. 14/873,855, filed on Oct. 2, 2015, which is a continuation of U.S. application Ser. No. 13/122,606, filed on Apr. 5, 2011, which is a U.S. national stage of International Application No. PCT/FR2009/051814, filed on Sep. 24, 2009, which claims the benefit of French Application No. 08.56836, filed on Oct. 9, 2008 and French Application No. 08.56817, filed on Oct. 8, 2008. The entire contents of each of U.S. application Ser. No. 15/396,855, U.S. application Ser. No. 14/873,855, U.S. application Ser. No. 13/122,606, International Application No. PCT/FR2009/051814, French Application No. 08.56836, and French Application No. 08.56817 are hereby incorporated herein by reference in their entirety.

FIELD OF INVENTION

The present invention relates to compositions comprising hydrofluoroolefins and to their uses as heat transfer fluids, blowing agents, solvents and aerosols.

BACKGROUND AND SUMMARY

The problems posed by substances which deplete the atmospheric ozone layer (ODP: ozone depletion potential) were tackled at Montreal, where a protocol was signed which imposes a reduction on the production and use of chlorofluorocarbons (CFCs). This protocol has been the subject of amendments, which have imposed the abandonment of CFCs and have extended the regulations to other products, among them hydrochlorofluorocarbons (HCFCs).

The refrigeration industry and the air conditioning industry have invested much in the replacement of these refrigerant fluids, and a product of this investment has been the commercialization of hydrofluorocarbons (HFCs).

(Hydro)chlorofluorocarbons which are used as expandants or solvents have also been replaced by HFCs.

In the automotive industry, the air-conditioning systems of vehicles which are sold in many countries have switched from a chlorofluorocarbon (CFC-12) refrigerant fluid to that of a hydrofluorocarbon (1,1,1,2-tetrafluoroethane: HFC-134a), which is less harmful to the ozone layer. However, in view of the objectives set by the Kyoto Protocol, HFC-134a (GWP=1300) is considered to have a high warming potential. The contribution to the greenhouse effect of a fluid is quantified by a criterion, the GWP (global warming potential), which indexes the warming potential by taking a reference value of 1 for carbon dioxide.

Carbon dioxide, being non-toxic, non-flammable and having a very low GWP, has been proposed as a refrigerant fluid for air-conditioning systems, as a replacement for HFC-134a. However, the use of carbon dioxide presents a number of disadvantages, associated in particular with the very high pressure of its use as a refrigerant fluid in existing apparatus and technologies.

Moreover, the mixture R-404A, composed of 44% by weight of pentafluoroethane, 52% by weight of trifluoroethane and 4% by weight of HFC-134a, is widely used as a refrigerant fluid in superstores (supermarket) and in refrigerated transport. This mixture, however, has a GWP of 3900. The mixture R-407C, composed of 52% by weight of HFC-134a, 25% by weight of pentafluoroethane and 23% by weight of difluoromethane, is used as a heat transfer fluid in air conditioning and in heat pumps. This mixture, however, has a GWP of 1800.

Document JP 4110388 describes the use of hydrofluoropropenes of formula $C_3H_mF_n$, where m and n represent an integer between 1 and 5 inclusive and m+n=6, as heat transfer fluids, especially tetrafluoropropene and trifluoropropene.

Document WO 2004/037913 discloses the use of compositions comprising at least one fluoroalkene having three or four carbon atoms, more particularly pentafluoropropene and tetrafluoropropene, preferably having a GWP of not more than 150, as heat transfer fluids.

Document WO 2005/105947 teaches the addition to tetrafluoropropene, preferably 1,3,3,3-tetrafluoropropene, of a co-blowing agent such as difluoromethane, pentafluoroethane, tetrafluoroethane, difluoroethane, heptafluoropropane, hexafluoropropane, pentafluoropropane, pentafluorobutane, water or carbon dioxide.

Document WO 2006/094303 discloses an azeotropic composition containing 7.4% by weight of 2,3,3,3-tetrafluoropropene (1234yf) and 92.6% by weight of difluoromethane (HFC-32). This document likewise discloses an azeotropic composition containing 91% by weight of 2,3,3,3-tetrafluoropropene and 9% by weight of difluoroethane (HFC-152a).

DETAILED DESCRIPTION

The applicant has now developed compositions which contain hydrofluoropropenes, which can be used as a heat transfer fluid, which do not have the aforementioned drawbacks and which combine a zero ODP with a GWP lower than that of existing heat transfer fluids such as R-404A or R-407C or R22 (chlorodifluoromethane).

The compositions according to the present invention are characterized in that they comprise 60% to 90% by weight of 2,3,3,3-tetrafluoropropene and 10% to 40% by weight of at least one compound selected from difluoroethane and difluoromethane.

According to a first embodiment of the invention the compositions comprise 60% to 79% by weight of 2,3,3,3-tetrafluoropropene and 21% to 40% by weight of a compound selected from difluoroethane and difluoromethane.

The compositions according to this first embodiment preferably comprise 60% to 70% by weight of 2,3,3,3-tetrafluoropropene and 30% to 40% by weight of a compound selected from difluoroethane and difluoromethane.

Advantageously the compositions according to this first embodiment comprise 60% to 65% by weight of 2,3,3,3-tetrafluoropropene and 35% to 40% by weight of a compound selected from difluoroethane and difluoromethane.

The compositions which are particularly preferred according to this first embodiment comprise 2,3,3,3-tetrafluoropropene and difluoromethane.

Advantageously these compositions contain essentially 2,3,3,3-tetrafluoropreopene and difluoromethane.

According to a second embodiment of the invention the compositions comprise 60% to 90% by weight of 2,3,3,3-tetrafluoropropene and 10% to 40% by weight of a mixture composed of dichloromethane and difluoroethane.

The compositions which are preferred according to this second embodiment comprise 60% to 80% by weight of 2,3,3,3-tetrafluoropropene and 20% to 40% by weight of a mixture composed of difluoromethane and difluoroethane.

The compositions which are advantageously preferred according to this second embodiment comprise 60% to 75% by weight of 2,3,3,3-tetrafluoropropene and 25% to 40% by weight of a mixture composed of difluoromethane and difluoroethane.

Particularly preferred compositions comprise 60% to 80% by weight of 2,3,3,3-tetrafluoropropene and 5% to 35% by weight of difluoromethane and 5% to 35% by weight of difluoroethane.

The compositions which are of interest are those comprising or containing essentially 60% to 80% by weight of 2,3,3,3-tetrafluoropropene and 10% to 30% by weight of difluoromethane and 10% to 30% by weight of difluoroethane.

The compositions according to the invention may comprise a stabilizer for 2,3,3,3-tetrafluoropropene. The stabilizer represents not more than 5% by weight, relative to the total composition.

Stabilizers include more particularly nitromethane, ascorbic acid, terephthalic acid, azoles such as tolutriazole or benzotriazole, phenolic compounds such as tocopherol, hydroquinone, tert-butylhydroquinone, 2,6-di-tert-butyl-4-methylphenol, epoxides (alkyl, optionally fluorinated or perfluorinated, or alkenyl or aromatic) such as n-butyl glycidyl ether, hexanediol diglycidyl ether, allyl glycidyl ether and butylphenyl glycidyl ether, phosphites, phosphates, phosphonates, thiols and lactones.

The compositions according to the present invention may comprise lubricants such as mineral oil, alkylbenzene, polyalkylene glycol and polyvinyl ether.

The compositions according to the present invention are suitable for replacing R-404A in refrigeration and/or R-407C in air conditioning and heat pumps in existing systems. They may also be suitable for replacing R-404A in refrigeration systems with a cascaded compression regime in which at least one stage is operated with the compositions according to the present invention. Examples of compositions which are of particular interest for the replacement of R-404A in existing systems include those comprising or containing essentially 60% by weight of 2,3,3,3-tetrafluoropropene and 40% by weight of difluoromethane; 70% by weight of 2,3,3,3-tetrafluoropropene and 30% by weight of difluoromethane; and 60% by weight of 2,3,3,3-tetrafluoropropene, 30% by weight of difluoromethane and 10% by weight of difluoroethane.

Examples of compositions which are of particular interest for the replacement of R-404A in systems operating with a cascaded compression regime include those comprising or containing essentially 60% by weight of 2,3,3,3-tetrafluoropropene and 40% by weight of difluoroethane; 70% by weight of 2,3,3,3-tetrafluoropropene and 30% by weight of difluoroethane; and 75% by weight of 2,3,3,3-tetrafluoropropene, 20% by weight of difluoromethane and 5% by weight of difluoroethane.

The compositions according to the present invention may also be used as a replacement for R-407C, for example in heat pumps.

Examples of compositions which are of particular interest for the replacement of R-407C in existing systems include those comprising or containing essentially 60% by weight of 2,3,3,3-tetrafluoropropene and 40% by weight of difluoromethane; 70% by weight of 2,3,3,3-tetrafluoropropene and 30% by weight of difluoromethane; 60% by weight of 2,3,3,3-tetrafluoropropene, 30% by weight of difluoromethane and 10% by weight of difluoroethane; and 70% by weigh of 2,3,3,3-tetrafluoropropene, 25% by weight of difluoromethane and 5% by weight of difluoroethane.

The compositions according to the present invention can be used, furthermore, as blowing agents, aerosols and solvents.

Experimental Section

The performance data of the compositions according to the invention under the operating conditions of refrigeration are given in Table 1. The values of the constituents (1234yf, 32 and 152a) for each composition are given as percentages by weight.
For R404A, the nominal operating pressure is 18 bar, the volumetric capacity is 1500 kJ/m$^3$ and the COP is 1.8 under the following operating conditions:
Evaporation temperature: −20° C.
Condensation temperature: 40° C.
Compressor inlet temperature: −5° C.
Super cooled liquid temperature: 33° C.
Isentropic yield of the compressor: 70%
BP: pressure at the evaporator
HP: pressure at the condenser
Ratio: compression ratio
T comp outlet: temperature at the compressor outlet
COP: coefficient of performance—defined, for the purposes of refrigeration, as being the useful cooling power supplied by the system, as a proportion of the power provided or consumed by the system.
CAP: volumetric capacity (kJ/m$^3$)
% CAP or COP is the ratio of the value of the CAP or COP of the mixture in relation to the same value for R404A.

TABLE 1

| Compositions | | | BP | HP | Ratio | T comp. | | |
|---|---|---|---|---|---|---|---|---|
| 1234yf | 32 | 152a | (bar) | (bar) | (p/p) | outlet | % COP | % CAP |
| R404A | | | 3 | 18 | 6.10 | 77 | 100 | 100 |
| 60 | 40 | 0 | 2.7 | 21 | 7.57 | 111 | 96 | 102 |
| 70 | 30 | 0 | 2.4 | 19 | 8.02 | 104 | 94 | 89 |
| 75 | 25 | 0 | 2.2 | 18 | 8.19 | 101 | 94 | 83 |
| 60 | 20 | 20 | 2.0 | 16 | 8.01 | 100 | 98 | 76 |
| 60 | 30 | 10 | 2.3 | 18 | 7.94 | 106 | 96 | 88 |
| 70 | 25 | 5 | 2.2 | 18 | 8.10 | 101 | 95 | 83 |
| 70 | 20 | 10 | 2.0 | 16 | 8.07 | 98 | 96 | 77 |
| 75 | 20 | 5 | 2.0 | 16 | 8.16 | 97 | 95 | 77 |
| 75 | 15 | 10 | 1.9 | 15 | 8.01 | 93 | 97 | 72 |
| 85 | 10 | 5 | 1.8 | 14 | 7.92 | 86 | 99 | 67 |
| 60 | 0 | 40 | 1.5 | 10 | 6.60 | 79 | 114 | 59 |
| 70 | 0 | 30 | 1.5 | 10 | 6.53 | 76 | 113 | 59 |

The performance data of the compositions according to the present invention under the operating conditions of a heat pump and air conditioning are given in Table 2. The values of the constituents (1234yf, 32 and 152a) for each composition are given as percentages by weight.
For R407C, the nominal operating pressure is 34 bar, the volumetric capacity is 1461 kJ/m$^3$ and the COP is 2.1 under the following operating conditions:
Evaporation temperature: −5° C.
Condensation temperature: 70° C.
Compressor inlet temperature: 5° C.
Supercooled liquid temperature: 65° C.
Isentropic yield of the compressor: 70%
BP: pressure at the evaporator
HP: pressure at the condenser
Ratio: compression ratio
T comp outlet: temperature at the compressor outlet
COP: coefficient of performance—defined, for the purposes of a heat pump, as being the useful heating power supplied by the system, as a proportion of the power provided or consumed by the system.

CAP: volumetric capacity (kJ/m$^3$)
% CAP or COP is the ratio of the value of the CAP or COP of the mixture in relation to the same value for the R-407C.

TABLE 2

| Compositions | | | BP | HP | Ratio | T comp. | | |
|---|---|---|---|---|---|---|---|---|
| 1234yf | 32 | 152a | (bar) | (bar) | (p/p) | outlet | % COP | % CAP |
| R407C | | | 3.9 | 34.4 | | 127 | 100 | 100 |
| 60 | 40 | 0 | 4.8 | 39.7 | 8.30 | 133 | 91.9 | 112 |
| 70 | 30 | 0 | 4.2 | 36.5 | 8.69 | 126 | 92.4 | 99 |
| 75 | 25 | 0 | 3.9 | 34.6 | 8.85 | 122 | 93.2 | 93 |
| 60 | 20 | 20 | 3.5 | 30.1 | 8.64 | 121 | 101.5 | 89 |
| 60 | 30 | 10 | 4.1 | 35.0 | 8.60 | 128 | 97.1 | 101 |
| 70 | 25 | 5 | 3.9 | 33.9 | 8.74 | 123 | 95.5 | 94 |
| 70 | 20 | 10 | 3.6 | 31.2 | 8.70 | 119 | 98.3 | 88 |
| 75 | 20 | 5 | 3.6 | 31.8 | 8.79 | 118 | 96.4 | 88 |
| 75 | 15 | 10 | 3.3 | 28.9 | 8.64 | 113 | 99.3 | 82 |
| 85 | 10 | 5 | 3.1 | 26.7 | 8.58 | 107 | 99.3 | 75 |
| 60 | 0 | 40 | 2.6 | 18.9 | 7.27 | 98 | 113.7 | 67 |
| 70 | 0 | 30 | 2.7 | 19.1 | 7.19 | 95 | 111.3 | 66 |

The invention claimed is:

1. A method of replacing R-404A in a heat pump or air conditioner, the method comprising replacing a first heat transfer fluid of R-404A with a second heat-transfer fluid comprising a composition consisting of 60% to 65% by weight of 2,3,3,3-tetrafluoropropene and 35% to 40% by weight of difluoromethane, and optionally a stabilizer.

2. The method as claimed in claim 1, wherein the composition consists of 60% by weight of 2,3,3,3-tetrafluoropropene and 40% of difluoromethane, and optionally a stabilizer.

3. The method as claimed in claim 1, wherein the composition further contains the stabilizer.

4. The method as claimed in claim 3, wherein the stabilizer is selected from the group consisting of nitromethane, ascorbic acid, terephthalic acid, azoles, phenolic compounds, epoxides, phosphites, phosphates, phosphonates, thiols and lactones.

5. The method as claimed in claim 3, wherein stabilizer represents at most 5% by weight relative to the composition.

6. The method as claimed in claim 1, wherein the second heat-transfer fluid further contains a lubricant.

7. The method as claimed in claim 6, wherein the lubricant is selected from the group consisting of mineral oil, alkylbenzene, polyalkylene glycol and polyvinyl ether.

8. The method as claimed in claim 1, wherein the composition consists of 65% by weight of 2,3,3,3-tetrafluoropropene and 35% of difluoromethane, and optionally a stabilizer.

9. A method of replacing R407C in a heat pump or air conditioner, the method comprising replacing a first heat transfer fluid of R407C with a second heat-transfer fluid comprising a composition consisting of 60% to 65% by weight of 1234yf and 35% to 40% by weight of R32, and optionally a stabilizer.

10. The method as claimed in claim 9, wherein the composition consists of 60% by weight of 2,3,3,3-tetrafluoropropene and 40% of difluoromethane, and optionally a stabilizer.

11. The method as claimed in claim 9, wherein the composition consists of 65% by weight of 2,3,3,3-tetrafluoropropene and 35% of difluoromethane, and optionally a stabilizer.

12. The method as claimed in claim 9, wherein the composition further contains the stabilizer.

13. The method as claimed in claim 12, wherein the stabilizer is selected from the group consisting of nitromethane, ascorbic acid, terephthalic acid, azoles, phenolic compounds, epoxides, phosphites, phosphates, phosphonates, thiols and lactones.

14. The method as claimed in claim 12, wherein stabilizer represents at most 5% by weight relative to the composition.

15. The method as claimed in claim 9, wherein the second heat-transfer fluid further contains a lubricant.

16. The method as claimed in claim 15, wherein the lubricant is selected from the group consisting of mineral oil, alkylbenzene, polyalkylene glycol and polyvinyl ether.

* * * * *